United States Patent
Liu

(10) Patent No.: US 12,334,746 B2
(45) Date of Patent: Jun. 17, 2025

(54) POWER SUPPLY METHOD AND APPARATUS, ELECTRONIC DEVICE AND STORAGE MEDIUM

(71) Applicant: Beijing Xiaomi Mobile Software Co., Ltd., Beijing (CN)

(72) Inventor: Jiquan Liu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 21 days.

(21) Appl. No.: 18/344,325

(22) Filed: Jun. 29, 2023

(65) Prior Publication Data
US 2024/0275207 A1 Aug. 15, 2024

(30) Foreign Application Priority Data

Feb. 10, 2023 (CN) .......................... 202310156777.6

(51) Int. Cl.
*H02J 50/10* (2016.01)
*H02J 7/00* (2006.01)

(52) U.S. Cl.
CPC ............ *H02J 50/10* (2016.02); *H02J 7/0049* (2020.01); *H02J 7/0068* (2013.01); *H02J 7/007194* (2020.01)

(58) Field of Classification Search
CPC ....................................................... H02J 50/10
USPC ............................................................. 307/19
See application file for complete search history.

(56) References Cited

U.S. PATENT DOCUMENTS

2018/0262043 A1* 9/2018 Yi ........................... H02J 50/10
2021/0251109 A1 8/2021 Wippler

OTHER PUBLICATIONS

Extended European Search Report Issued Jan. 17, 2024 in European Application 23182881.5, 8 pages.

* cited by examiner

*Primary Examiner* — Joseph Chang
(74) *Attorney, Agent, or Firm* — Oblon, McClelland, Maier & Neustadt, L.L.P.

(57) ABSTRACT

A power supply method, applied to an electronic device, that can include determining a charging state related to charging a battery of the electronic device by using a wireless charging device, determining a current temperature of the electronic device, and supplying power to the electronic device by using the wireless charging device and the battery in response to the charging state indicating the battery being fully charged and the current temperature being greater than a preset temperature threshold.

17 Claims, 4 Drawing Sheets

POWER SUPPLY METHOD AND APPARATUS, ELECTRONIC DEVICE AND STORAGE MEDIUM

CROSS-REFERENCE TO RELATED APPLICATIONS

The present application claims the benefit of priority to Chinese patent application No. 2023101567776, filed on Feb. 10, 2023, the contents of which are incorporated herein by reference in their entireties for all purposes.

BACKGROUND OF THE INVENTION

With the development of wireless charging technology, wireless charging is widely used in electronic devices such as cell phones and tablet computers. However, wireless charging technology has limited heat dissipation capability, which easily leads to high heat generation in electronic devices. Especially after the electronic device is fully charged based on a wireless charger, if the wireless charger is still connected to the electronic device wirelessly, the electronic device may experience the problem of heat generation exceeding a heat generation standard during operation.

SUMMARY OF THE INVENTION

The present disclosure relates to the field of wireless charging technology, and in particular to a power supply method and apparatus, electronic device and storage medium. The present disclosure provides a power supply method and apparatus, electronic device and storage medium.

According to a first aspect of embodiments of the present disclosure, a power supply method is provided. The method is applied to an electronic device and can include determining a charging state related to charging a battery of the electronic device by using a wireless charging device, and determining a current temperature of the electronic device. The method can further include supplying power to the electronic device by using both the wireless charging device and the battery in response to the charging state indicating the battery being fully charged and the current temperature being greater than a preset temperature threshold.

According to a second aspect of the embodiments of the present disclosure, an electronic device is provided. The electronic device can include a processor and a memory that is configured to store an instruction executable by the processor. The processor can be configured to implement the power supply method according to the first aspect.

According to a third aspect of the embodiments of the present disclosure, a storage medium is provided. An instruction in the storage medium, when executed by a processor of an electronic device, enables the electronic device to implement the power supply method according to the first aspect.

It should be understood that the above general description and the later detailed description are examples and are explanatory only, and do not limit the present disclosure.

BRIEF DESCRIPTION OF THE DRAWINGS

The accompanying drawings herein are incorporated into the specification and form a part of the specification, showing embodiments that comply with the present disclosure, and are used together with the specification to explain the principles of the present disclosure.

DETAILED DESCRIPTION OF THE PREFERRED EMBODIMENTS

Embodiments will be described herein in detail, examples of which are represented in the accompanying drawings. Where the following description relates to the accompanying drawings, the same numerals in different accompanying drawings indicate the same or similar elements unless otherwise indicated. The embodiments described in the following embodiments do not represent all embodiments that are consistent with the present disclosure. Rather, they are only examples of apparatus and methods that are consistent with some aspects of the present disclosure, as detailed in the appended claims.

One embodiment of the present disclosure provides a power supply method, applied to an electronic device. The executing body of the method may be a processor of the electronic device, such as a device having data processing and control, including a central processing unit (CPU), a microcontroller unit (MCU), etc. The electronic device may be a user equipment (UE), a tablet computer, a gaming device or a wearable device, etc. In some possible implementations, the power supply method may be implemented by way of the processor calling a computer-readable instruction stored in a memory.

Figure 1:
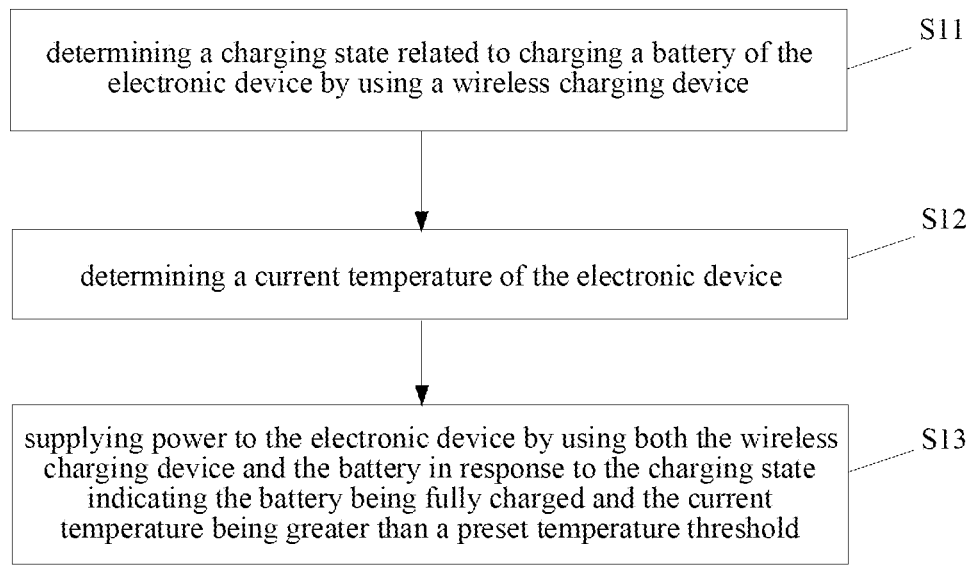
FIG. 1 is a flowchart of a power supply method illustrated in an embodiment of the present disclosure.

FIG. 1 is a flowchart of a power supply method illustrated in an embodiment of the present disclosure. The method is applied to an electronic device. As shown in FIG. 1, the method includes the following steps S11 to S13.

In the step S11, a charging state related to charging a battery of the electronic device by using a wireless charging device is determined.

In the step S12, a current temperature of the electronic device is determined.

In the step S13, power is supplied to the electronic device by using both the wireless charging device and the battery in response to the charging state indicating the battery being fully charged and the current temperature being greater than a preset temperature threshold.

In one embodiment of the present disclosure, the wireless charging device may be a wireless charger, such as a wireless disc charger. The wireless charging device may also be referred to as a wireless charging transmitter, and the wireless charging transmitter sends energy by driving a built-in coil to cause the coil built into the electronic device (i.e., the wireless charging receiver) of the embodiment of the present disclosure to inductively receive energy, thereby enabling charging a battery in the electronic device. The battery in the electronic device may be a lithium battery.

In the step S11, the electronic device determines the charging state related to charging the battery of the electronic device by using the wireless charging device, and the charging state may include a state indicating whether the battery is fully charged and may also include a charge level of the battery. If the charging state is a percentage of the charge level of the battery, the battery is indicated as fully charged when the charge level is 100% or greater than 98%. Otherwise, the battery is indicated as not fully charged.

In the step S12, the electronic device determines its own temperature, for example, the electronic device may detect its own temperature via a built-in temperature sensor. The temperature sensor may detect the temperature of the electronic device by using a negative temperature coefficient (NTC) thermistor or a positive temperature coefficient (PTC) thermistor. In addition, the temperature of the electronic device may refer to the temperature at which the CPU of the electronic device is located, or may also refer to the temperature of the back cover of the electronic device, which is not limited by the embodiments of the present disclosure.

In the step S13, based on the monitored charging state of the battery and the current temperature of the electronic device, power is supplied to the system of the electronic device by using both the wireless charging device and the battery in response to the battery being fully charged and the current temperature being greater than the preset temperature threshold. Supplying power to the electronic device includes, for example, supplying power to a display, a built-in sensor, and a CPU of the electronic device. The preset temperature threshold may be a temperature set according to the heat generation standard, for example, the heat generation standard requires that the temperature of the electronic device does not exceed 46 degrees, and the preset temperature threshold may be set to a temperature lower than the heat generation standard (such as 37 degrees), so that the electronic device instantly adjusts the power supply method to reduce the possibility of the heat generation of the electronic device exceeding the heat generation standard.

Figure 2:
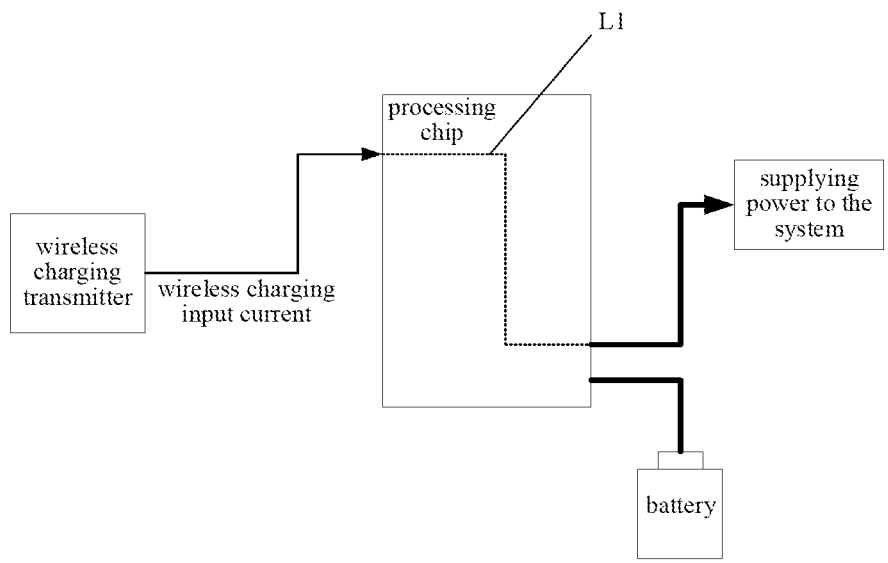
FIG. 2 is an example diagram of supplying power to a system in related arts.

FIG. 2 is an example diagram of supplying power to a system in related arts. As shown in FIG. 2, if the electronic device is still connected to the wireless charging transmitter after being fully charged, the electronic device uses the current provided by the wireless charging transmitter to supply power to the system of the electronic device based on the processing of the processing chip, i.e., to supply power to the system based on the path identified by L1, and the battery does not need to provide electrical power to the system. However, on the one hand, when using the wireless charging device to supply power to the electronic device, because the input voltage of the wireless charging device needs to be reduced and stabilized before supplying power to the system, the pathway impedance is large, which may lead to a high temperature of the electronic device; on the other hand, when using the wireless charging device to charge the battery, the charging power may be less than 5 watts when the charging power gradually decreases and the battery is almost fully charged, at which time the electronic device may automatically turn off the fan to reduce the impact of fan noise, which may cause the heat during the charging process and the heat during the subsequent power supply to the system to be unable to dissipate, causing the temperature of the electronic device to be too high.

In this regard, in the embodiments of the present disclosure, power is supplied to the electronic device by using both the wireless charging device and the battery in response to determining that the battery is fully charged and the current temperature of the electronic device is greater than a preset temperature threshold. Since the voltage supplied through the battery is close to the power supply voltage of the system, there is no need for the process of voltage reduction and voltage stabilization, and thus the pathway impedance is smaller. Compared to a method of using only the wireless charging device to supply power, the embodiments of the present disclosure can reduce the heat generation of the electronic device. Compared to a method of using only the battery to supply power, the embodiments of the present disclosure can save battery power. It is understood that the method of using both the wireless charging device and the battery to supply power provided by the embodiments of the present disclosure can reduce the heat generation of the electronic device as much as possible while taking into account the battery power consumption, and thus can improve the user experience.

Figure 3:
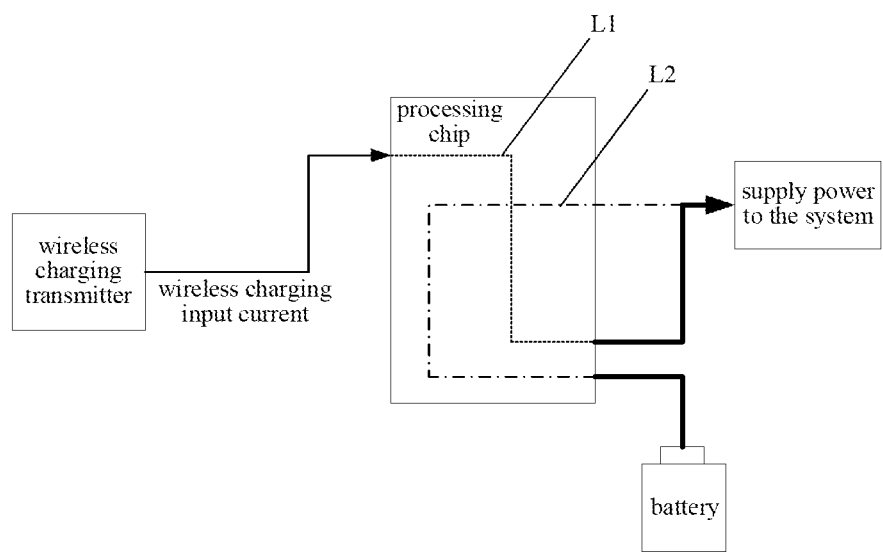
FIG. 3 is an example diagram of supplying power to a system provided by an embodiment of the present disclosure.

FIG. 3 is an example diagram of supplying power to a system provided by an embodiment of the present disclosure. As shown in FIG. 3, if the electronic device is also connected to the wireless charging transmitter after being fully charged, the electronic device uses the current provided by both the wireless charging transmitter and the battery to supply power to the system of the electronic device based on the processing of the processing chip, i.e., to supply power to the system based on the paths identified by L1 and L2.

It should be noted that in one embodiment of the present disclosure, the electronic device, while connected to the wireless charging device, may be triggered to perform the steps S11 to S13 above for a preset duration to adjust the power supply method in order to reduce the heat generation of the electronic device. In addition, when the battery is fully charged and the current temperature is greater than the preset temperature threshold, power is supplied to the system of the electronic device by using both the wireless charging device and the battery, in some embodiments, it may be that the wireless charging device and the battery supply power to the system according to their respective preset power allocation ratios, where the sum of the power allocated by the wireless charging device and the battery meets the power required to power the system. For example, the wireless charging device and the battery each provide 50% of the electrical energy required to power the system.

In other embodiments, the supplying power to the electronic device by using both the wireless charging device and the battery includes determining, based on the current temperature, a first power supply parameter value corresponding to the wireless charging device and a second power supply parameter value corresponding to the battery, and supplying power to the electronic device based on the first power supply parameter value and the second power supply parameter value.

In these embodiments, the electronic device determines in advance the respective corresponding power supply parameter values of the wireless charging device and the battery based on the current temperature, and then uses the wireless charging device and the battery to supply power to the system based on the respective corresponding power supply parameter values. The power supply parameter values may be current values, and may also be power values, etc., which are not limited by the embodiments of the present disclosure.

It should be noted that in one embodiment of the present disclosure, the first power supply parameter value of the wireless charging device may be negatively correlated with the current temperature, and correspondingly, the second power supply parameter value of the battery may be positively correlated with the current temperature, in such a way as to reduce the possibility of aggravating the heat generation of the electronic device due to the heat generated by the power supply of the wireless charging device. For example, the higher the current temperature, the lower the power supply current of the wireless charging device may be, and correspondingly, the higher the power supply current of the battery.

It may be understood that in one embodiment of the present disclosure, the electronic device dynamically determines the respective power supply parameter values of the wireless charging device and the battery based on the current temperature, and the reasonable allocation based on the actual temperature of the electronic device can help control the heat generation of the electronic device in an intelligent manner.

In some embodiments, the method further includes obtaining a current total power consumption value of the electronic device.

In these embodiments, the determining, based on the current temperature, the first power supply parameter value corresponding to the wireless charging device and the second power supply parameter value corresponding to the battery includes determining, based on the current temperature, a heat dissipation coefficient of the electronic device, and determining, based on the total power consumption value and the heat dissipation coefficient, the first power supply parameter value corresponding to the wireless charging device and the second power supply parameter value corresponding to the battery.

In one embodiment of the present disclosure, when the electronic device determines the respective power supply parameter values of the wireless charging device and the battery based on the current temperature, the current total power consumption value of the electronic device is first obtained and the heat dissipation coefficient of the electronic device is determined based on the current temperature. The total power consumption value may be characterized by a power value, or by an electrical parameter such as a current value, which is not limited by the embodiments of the present disclosure.

It should be noted that the current total power consumption value obtained by the electronic device may be determined based on the built-in monitoring module of the electronic device. For example, the total power consumption value is determined by monitoring the utilization rate of the CPU. The total power consumption value may also be determined by the electronic device based on a preset mapping relationship between temperatures and power consumption values. The preset mapping relationship between temperatures and power consumption values may be formed based on a large number of sample data statistics of temperatures and power consumption values. The electronic device obtains, based on the current temperature, the total power consumption value corresponding to the current temperature through the preset mapping relationship.

Generally, the temperature of the electronic device is positively correlated with the system power consumption value. Table 1 shows the total power consumption values corresponding to different monitored temperatures, and the electronic device is a cell phone as an example. As shown in Table 1 below, the case temperature of the cell phone corresponds to the temperature of the cell phone, and the system power consumption is the total power consumption value of the cell phone. From Table 1, it can be seen that the higher the case temperature of the cell phone, the greater the system power consumption value.

TABLE 1

Temperatures and total power consumption values.

| case temperature of cell phone (° C.) | system power consumption (mA) |
| --- | --- |
| less than 37° C. | 50 mA |
| less than 40° C. | 100 mA |
| less than 43° C. | 150 mA |
| less than 46° C. | 200 mA |
| greater than 46° C. . . . | . . . |

In one embodiment of the present disclosure, since the heat dissipation module in the electronic device may dissipate heat to a certain extent based on the temperature of the electronic device, such as using a cold pump, gel or diamond, etc., the degree of heat dissipation is related to the temperature of the electronic device, and thus the heat dissipation coefficient determined based on the current temperature of the electronic device in the embodiment of the present disclosure can more accurately reflect the actual heat dissipation of the electronic device. On this basis, the embodiment of the present disclosure determines the respective power supply parameters of the wireless charging device and the battery based on the total power consumption value and the heat dissipation coefficient of the electronic device, which can more accurately control the heat generation of the electronic device while supplying power.

It should be noted that in one embodiment of the present disclosure, the heat dissipation coefficient of the electronic device may be determined based on the current temperature, and the heat dissipation coefficient may be obtained by conducting an experiment on the sample electronic device to obtain an estimation model or by constructing a mapping relationship. In some embodiments, the estimation model is trained based on a deep learning network by synchronously monitoring a large amount of sample data of temperatures and heat dissipation of the sample electronic device. For example, the estimation model is obtained by training and tuning a network such as a convolutional neural network (CNN) and deep neural network (DNN) based on the training sample data and a label value, where the training sample data is the temperature of the sample electronic device, and the label value is the heat dissipation coefficient determined by the heat dissipation corresponding to the actual monitored temperature. Based on the trained estimation model, the heat dissipation coefficient corresponding to the current temperature may be obtained by inputting the current temperature into the model.

In other embodiments, a mapping relationship between temperatures and heat dissipation coefficients may also be constructed based on the monitored heat dissipation. The above mapping relationship may be a mapping relationship table or a constructed mapping function, which is not limited by the embodiments of the present disclosure. Based on the constructed mapping relationship, the heat dissipation coefficient corresponding to the current temperature may be obtained through table lookup or function calculation.

In these embodiments, the determining, based on the current temperature, the heat dissipation coefficient of the electronic device can include determining the heat dissipation coefficient corresponding to the current temperature based on a mapping relationship between temperatures and heat dissipation coefficients.

In these embodiments, the mapping relationship between temperatures and heat dissipation coefficients is the mapping between temperatures and heat dissipation coefficients constructed through conducting an experiment based on a large amount of sample data.

Table 2 shows the mapping relationship between temperatures and heat dissipation coefficients determined based on the cell phone. From Table 2, it can be seen that the higher the case temperature of the cell phone, the smaller the heat dissipation coefficient, which also indicates that relying only on the heat dissipation of the electronic device's own heat dissipation module may not be effective in reducing the temperature of the electronic device when the temperature is too high.

TABLE 2

Mapping relationship between temperatures and heat dissipation coefficients

| case temperature of cell phone (° C.) | heat dissipation coefficient |
|---|---|
| less than 37° C. | 0.7 |
| less than 40° C. | 0.5 |
| less than 43° C. | 0.35 |
| less than 46° C. | 0.2 |
| greater than 46° C. . . . | . . . |

It can be understood that in these embodiments of the present disclosure, determining the heat dissipation coefficient corresponding to the current temperature based on the pre-constructed mapping relationship is a simple and effective scheme.

In one embodiment of the present disclosure, when determining the respective power supply parameters of the wireless charging device and the battery based on the total power consumption value and the heat dissipation coefficient, any one of the power supply parameter values may be determined first, and then another power supply parameter value is determined based on the difference between the total power consumption value and the determined power supply parameter value. Both the total power consumption value and the power supply parameter value may be power values, or may be current values.

In some embodiments, the determining, based on the total power consumption value and the heat dissipation coefficient, the first power supply parameter value corresponding to the wireless charging device and the second power supply parameter value corresponding to the battery can include determining, based on the total power consumption value and the heat dissipation coefficient, the first power supply parameter value of the wireless charging device, an determining, based on the total power consumption value and the first power supply parameter value of the wireless charging device, the second power supply parameter value of the battery.

In these embodiments, priority is given to determining the first power supply parameter value of the wireless charging device based on the total power consumption value and the heat dissipation coefficient, and then determining the second power supply parameter value of the battery. Since the heat source of the electronic device is basically from the wireless charging when power is supplied to the electronic device by using both the wireless charging device and the battery, prioritizing the determination of the first power supply parameter value for the key object of the heat source (the wireless charging device) can make the determination of the power supply parameter value more reasonable and effective.

In some embodiments, he determining, based on the total power consumption value and the heat dissipation coefficient, the first power supply parameter value of the wireless charging device can include determining a product of the total power consumption value and the heat dissipation coefficient as the first power supply parameter value of the wireless charging device. The determining, based on the total power consumption value and the first power supply parameter value of the wireless charging device, the second power supply parameter value of the battery includes determining a difference between the total power consumption value and the first power supply parameter value of the wireless charging device as the second power supply parameter value of the battery.

In one embodiment of the present disclosure, assuming that the total power consumption value is H, the heat dissipation coefficient is M, the first power supply parameter value of the wireless charging device is T, the second power supply parameter value of the battery is I, and both the total power consumption value and the power supply parameter values (including the first power supply parameter value and the second power supply parameter value) are current values, the first power supply parameter value of the wireless charging device may be determined based on equation (1), and the second power supply parameter value of the battery may be determined based on equation (2):

$$T = H * M \quad (1)$$

$$I = H - T \quad (2)$$

It should be noted that in one embodiment of the present disclosure, after determining the respective power supply parameter values of the wireless charging device and the battery, the above power supply parameter values may be written into the corresponding hardware register, so that the circuit in the electronic device may allocate the power supply based on the values stored in the hardware register. The hardware register may be a readable and writable register, in which the power supply parameter value of the battery may be initially preset to ( ) and the power supply parameter value of the wireless charging device may be any value that supports the operation of the electronic device system, for example, 3 A, to meet the power supply demand of the electronic device before the power supply parameter values of the wireless charging device and the battery are dynamically determined based on the current temperature.

As previously described, the higher the temperature of the electronic device, the smaller the corresponding heat dissipation coefficient, thus in the embodiment, the product of the total power consumption value and the heat dissipation coefficient is determined as the first power supply parameter value of the wireless charging device, so that when the current temperature of the electronic device is high, the wireless charging device provides less energy to reduce the occurrence of the temperature of the electronic device rising too fast and too high due to the heat generation of the wireless charging device during power supply. When the current temperature of the electronic device is not too high, the wireless charging device provides a relatively large amount of energy, allowing for the balance of the battery power while controlling the heat generation of the electronic device. It can be understood that the scheme of the embodiments of the present disclosure has good intelligence.

In some embodiments, the method further includes supplying power to the electronic device by using the wireless charging device in response to the current temperature being less than or equal to the preset temperature threshold.

In these embodiments, if the current temperature of the electronic device is less than the preset temperature threshold, it indicates that the temperature of the electronic device is less likely to exceed the heat generation standard. At this time, the wireless charging device may be used to supply power to the electronic device to save the battery power.

Figure 4:
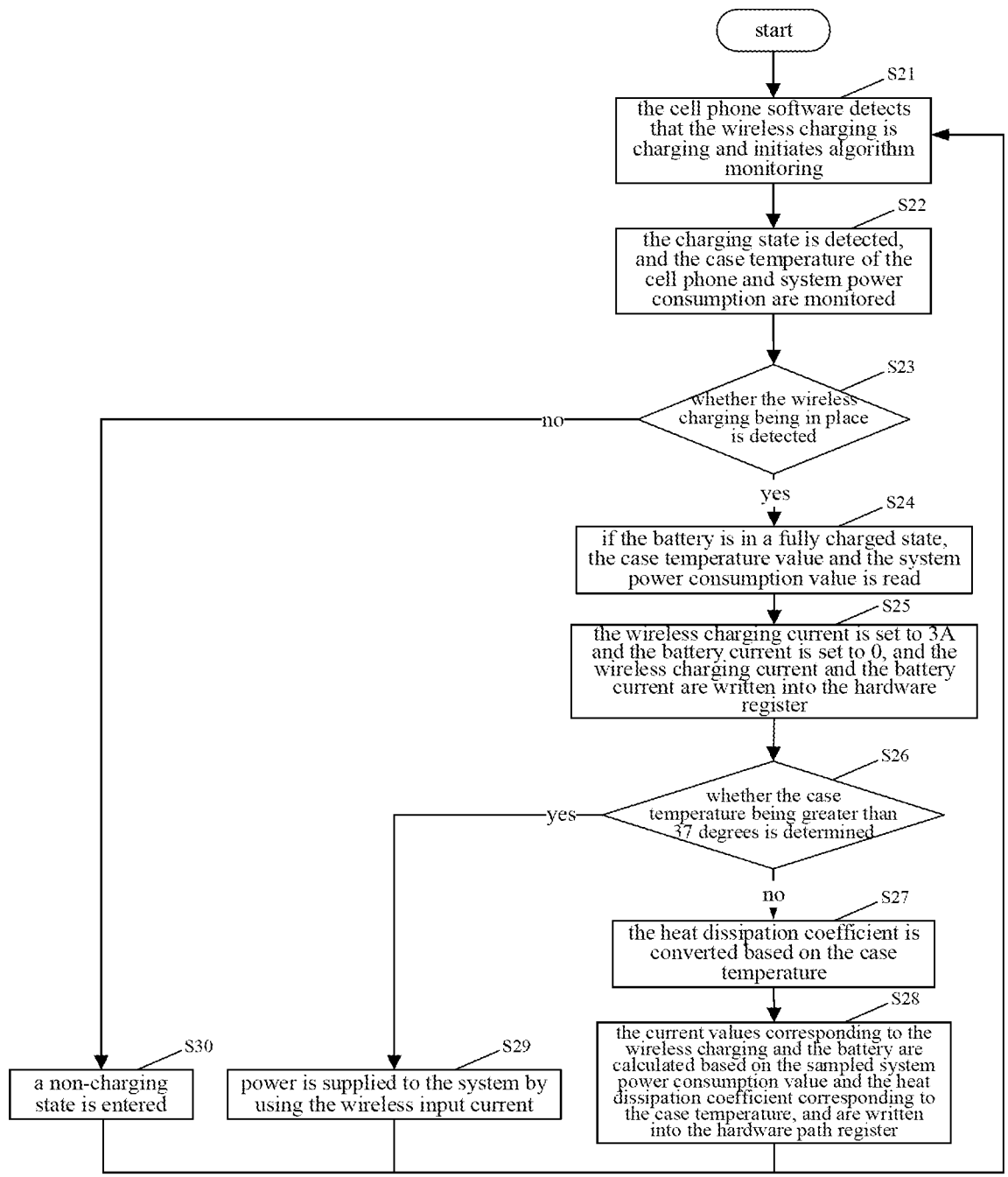
FIG. 4 is an example flowchart of a power supply method illustrated in an embodiment of the present disclosure.

FIG. 4 is an example flowchart of a power supply method illustrated in an embodiment of the present disclosure. The method is applied to a cell phone. As shown in FIG. 4, the method includes the following steps S21 to S30.

In the step S21, the cell phone software detects that the wireless charging is charging and initiates algorithm monitoring.

In this embodiment, the cell phone software, i.e., the function module built into the electronic device, is used for monitoring whether the electronic device is fully charged and the temperature of the electronic device, and then performing the control of the aforementioned power supply method.

In the step S22, the charging state is detected, and the case temperature of the cell phone and system power consumption are monitored.

In this embodiment, the case temperature of the cell phone is the current temperature of the electronic device, and the system power consumption is the current total power consumption value of the electronic device.

In the step S23, whether the wireless charging being in place is detected, and if the wireless charging is in place, the step S24 is performed; if the wireless charging is not in place, the step S30 is performed.

In this embodiment, detecting whether the wireless charging is in place determines whether the wireless charging device is still wirelessly connected to the cell phone, so that the cell phone may perform the step S24 or S30.

In the step S24, if the battery is in a fully charged state, the case temperature value and the system power consumption value are read.

In this embodiment, if the battery in the cell phone is fully charged and the wireless charging is in place, the detected case temperature value and system power consumption value are read for the determination of the power supply parameter values.

In the step S25, the wireless charging current is set to 3A and the battery current is set to 0, and the wireless charging current and the battery current are written into the hardware register.

In this embodiment, the wireless charging current is set to 3A and the battery current is set to 0, which are written into the hardware register to meet the power supply demand of the cell phone before the respective power supply parameter values of the wireless charging device and the battery are dynamically determined based on the current temperature.

In the step S26, whether the case temperature being greater than 37 degrees is determined. If the case temperature is greater than 37 degrees, the step S27 is performed, and if the case temperature is not greater than 37 degrees, the step S29 is performed.

In this embodiment, judging whether the case temperature is greater than 37 degrees means judging whether the current temperature is greater than the preset temperature threshold, and if the current temperature is greater than the preset temperature threshold, both the wireless charging device and the battery need to be used to supply power to the cell phone, otherwise, only the wireless charging device is used to supply power to the cell phone.

In the step S27, the heat dissipation coefficient is converted based on the case temperature. In this embodiment, converting the heat dissipation coefficient based on the case temperature means determining the heat dissipation coefficient corresponding to the current temperature according to the aforementioned Table 2.

In the step S28, the current values corresponding to the wireless charging and the battery are calculated based on the sampled system power consumption value and the heat dissipation coefficient corresponding to the case temperature, and are written into the hardware path register.

In this embodiment, after obtaining the system power consumption value and the heat dissipation coefficient, the cell phone may calculate the current of the wireless charging device and the current of the battery based on the aforementioned equation (1) and equation (2), and write them to the register so that the circuit in the cell phone may allocate the power supply based on the values stored in the register.

In the step S29, power is supplied to the system by using the wireless input current. In this embodiment, when the case temperature of the cell phone is less than or equal to 37 degrees, only the wireless charging device is used to supply power.

In the step S30, a non-charging state is entered. In this embodiment, if the cell phone is not connected to the wireless charger, the battery in the cell phone may not be charged and the wireless charging device may not be used to supply power to the system.

In the embodiment of the present disclosure, when it is determined that the battery is fully charged and the current case temperature of the cell phone is greater than 37 degrees, both the wireless charging device and the battery are used by the cell phone to supply power to the electronic device, which can reduce the heat generation of the cell phone as much as possible while taking into account the battery power consumption, and thus can enhance the user experience.

Figure 5:
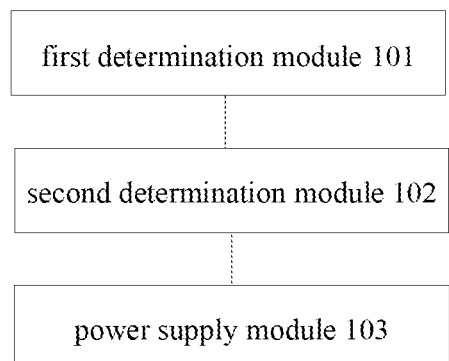
FIG. 5 is a diagram of a power supply apparatus illustrated according to an embodiment of the present disclosure.

FIG. 5 is a diagram of a power supply apparatus illustrated according to an embodiment of the present disclosure. The power supply apparatus is applied to an electronic device and includes a first determination module 101, configured to determine a charging state related to charging a battery of the electronic device by using a wireless charging device, a second determination module 102, configured to determine a current temperature of the electronic device, and a first power supply module 103, configured to supply power to the electronic device by using both the wireless charging device and the battery in response to the charging state indicating the battery being fully charged and the current temperature being greater than a preset temperature threshold.

In some embodiments, the first power supply module 103 is specifically configured to: determine, based on the current temperature, a first power supply parameter value corresponding to the wireless charging device and a second power supply parameter value corresponding to the battery; and supply power to the electronic device based on the first power supply parameter value and the second power supply parameter value.

In some embodiments, the apparatus can further include an obtaining module 104, configured to obtain a current total power consumption value of the electronic device.

The first power supply module 103 is specifically configured to determine, based on the current temperature, a heat dissipation coefficient of the electronic device, and determine, based on the total power consumption value and the heat dissipation coefficient, the first power supply parameter value corresponding to the wireless charging device and the second power supply parameter value corresponding to the battery.

In some embodiments, the first power supply module 103 is specifically configured to determine, based on the total power consumption value and the heat dissipation coefficient, the first power supply parameter value of the wireless charging device, and determine, based on the total power consumption value and the first power supply parameter value of the wireless charging device, the second power supply parameter value of the battery.

In some embodiments, the first power supply module 103 is specifically configured to determine a product of the total power consumption value and the heat dissipation coefficient as the first power supply parameter value of the wireless charging device, and determine a difference between the total power consumption value and the first power supply parameter value of the wireless charging device as the second power supply parameter value of the battery.

In some embodiments, the first power supply module 103 is specifically configured to determine the heat dissipation coefficient corresponding to the current temperature based on a mapping relationship between temperatures and heat dissipation coefficients.

In some embodiments, the apparatus further includes a second power supply module 105, configured to supply power to the electronic device by using the wireless charging device in response to the current temperature being less than or equal to the preset temperature threshold.

With respect to the apparatus in the above embodiments, the specific manner in which the individual modules perform operations has been described in detail in the embodiments relating to the method and will not be described in detail herein.

Figure 6:
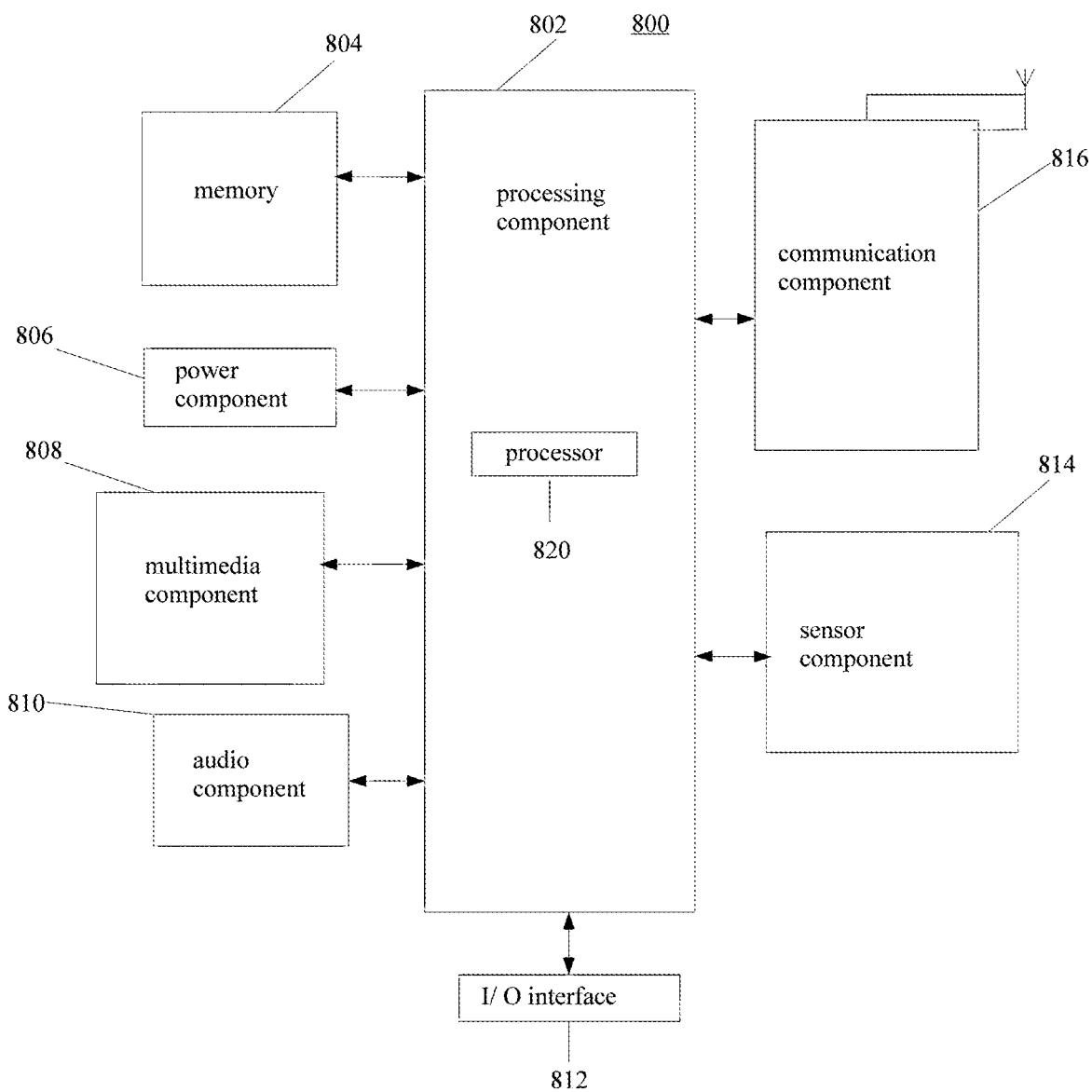
FIG. 6 is a block diagram of an electronic device illustrated according to an embodiment of the present disclosure.

FIG. 6 is a block diagram of an electronic device illustrated according to an embodiment of the present disclosure. The electronic device (device 800) may be, for example, a cell phone or a tablet computer as previously described, etc.

Referring to FIG. 6, the device 800 may include one or more of the following components a processing component 802, a memory 804, a power component 806, a multimedia component 808, an audio component 810, an input/output (I/O) interface 812, a sensor component 814, and a communication component 816.

The processing component 802 generally controls the overall operation of the device 800, such as an operation associated with display, phone call, data communication, camera operation, and recording operation. The processing component 802 may include one or more processors 820 to execute an instruction to complete all or some of the steps of the method described above. In addition, the processing component 802 may include one or more modules that facilitate interaction between the processing component 802 and other components. For example, the processing component 802 may include a multimedia module to facilitate interaction between the multimedia component 808 and the processing component 802.

The memory 804 is configured to store various types of data to support the operation at the device 800. Examples of such data include the following for any application or method to operate on the device 800: an instruction, contact data, phonebook data, messages, pictures, videos, etc. The memory 804 may be implemented by any type of volatile or non-volatile storage device or a combination thereof, such as a static random access memory (SRAM), electrically erasable programmable read-only memory (EEPROM), erasable programmable read-only memory (EPROM), programmable read-only memory (PROM), read-only memory (ROM), magnetic memory, flash memory, disk or optical disk.

The power supply component 806 provides power to various components of the device 800. The power supply component 806 may include a power management system, one or more power supplies, and other components associated with generating, managing, and distributing power for the device 800.

The multimedia component 808 includes a screen providing an output interface between the device 800 and a user. In some embodiments, the screen may include a liquid crystal display (LCD) and a touch panel (TP). If the screen includes a touch panel, the screen may be implemented as a touch screen to receive input signals from the user. The touch panel includes one or more touch sensors to sense touches, swipes, and gestures on the touch panel. The touch sensors may not only sense the boundaries of the touch or swipe action, but also detect the duration and pressure associated with the touch or swipe action. In some embodiments, the multimedia component 808 includes a front-facing camera and/or a rear-facing camera. The front-facing camera and/or rear-facing camera may receive external multimedia data when the device 800 is in an operating mode, such as shooting mode or video mode. Each front-facing camera and rear-facing camera may be a fixed optical lens system or have a focal length and optical zoom capability.

The audio component 810 is configured to output and/or input audio signals. For example, the audio component 810 includes a microphone (MIC) configured to receive external audio signals when the device 800 is in an operating mode, such as call mode, recording mode, and voice recognition mode. The received audio signals may be further stored in the memory 804 or sent via the communication component 816. In some embodiments, the audio component 810 further includes a speaker for outputting the audio signals.

The I/O interface 812 provides an interface between the processing component 802 and a peripheral interface module, and the peripheral interface module may be a keypad, click wheel, button, etc. These buttons may include, but are not limited to: a home button, a volume button, a start button, and a lock button.

The sensor component 814 includes one or more sensors for providing a state assessment of various aspects of the device 800. For example, the sensor component 814 may detect an open/closed state of the device 800, the relative positioning of the components, such as the components being the display and keypad of the device 800, and the sensor component 814 may also detect a change in the position of the device 800 or a change in the position of one component of the device 800, the presence or absence of user contact with the device 800, the orientation or acceleration/deceleration and the device 800, and temperature change of the device 800. The sensor component 814 may include a proximity sensor configured to detect the presence of a nearby object in the absence of any physical contact. The sensor component 814 may also include an infrared light sensor, such as a CMOS or CCD image sensor, for use in imaging applications. In some embodiments, the sensor component 814 may also include an accelerometer sensor, a gyroscope sensor, a magnetic sensor, a pressure sensor, or a temperature sensor.

The communication component 816 is configured to facilitate communication between the device 800 and other devices by wired or wireless means. The device 800 may access a wireless network based on any communication standard, such as Wi-Fi, 2G or 3G, or a combination thereof. In one embodiment, the communication component 816 receives broadcast signals or broadcast-related information from an external broadcast management system via a broadcast channel. In one embodiment, the communication component 816 further includes a near-field communication (NFC) module to facilitate short-range communication. For example, the NFC module may be implemented based on radio frequency identification (RFID) technology, infrared data association (IrDA) technology, ultra-wideband (UWB) technology, Bluetooth (BT) technology, and other technologies.

In some embodiments, the device 800 may be implemented by one or more application-specific integrated circuits (ASICs), digital signal processors (DSPs), digital signal processing devices (DSPDs), programmable logic devices (PLDs), field-programmable gate arrays (FPGAs), controllers, microcontrollers, microprocessors, or other electronic components for performing the above methods.

In some embodiments, a non-transitory computer-readable storage medium including an instruction is also provided. For example, the storage medium may be the memory 804 including an instruction, and the instruction is capable of being executed by the processor 820 of the device 800 to accomplish the method described above. For example, the non-transitory computer-readable storage medium may be a ROM, random access memory (RAM), CD-ROM, magnetic tape, floppy disk, optical data storage device, etc.

A non-transitory computer-readable storage medium is provided, an instruction in the storage medium, when executed by a processor of an electronic device, enables the electronic device to implement a power supply method. The method can include determining a charging state related to charging a battery of the electronic device by using a wireless charging device, and determining a current temperature of the electronic device. The method can further include supplying power to the electronic device by using both the wireless charging device and the battery in response to the charging state indicating the battery being fully charged and the current temperature being greater than a preset temperature threshold.

According to a first embodiment of the present disclosure, a power supply method is provided. The method is applied to an electronic device and can include determining a charging state related to charging a battery of the electronic device by using a wireless charging device, determining a current temperature of the electronic device. The method can further include supplying power to the electronic device by using both the wireless charging device and the battery in response to the charging state indicating the battery being fully charged and the current temperature being greater than a preset temperature threshold.

In some embodiments, the supplying power to the electronic device by using both the wireless charging device and the battery includes determining, based on the current temperature, a first power supply parameter value corresponding to the wireless charging device and a second power supply parameter value corresponding to the battery, and supplying power to the electronic device based on the first power supply parameter value and the second power supply parameter value.

In some embodiments, the method further includes obtaining a current total power consumption value of the electronic device. The determining, based on the current temperature, the first power supply parameter value corresponding to the wireless charging device and the second power supply parameter value corresponding to the battery includes determining, based on the current temperature, a heat dissipation coefficient of the electronic device, and determining, based on the total power consumption value and the heat dissipation coefficient, the first power supply parameter value corresponding to the wireless charging device and the second power supply parameter value corresponding to the battery.

In some embodiments, the determining, based on the total power consumption value and the heat dissipation coefficient, the first power supply parameter value corresponding to the wireless charging device and the second power supply parameter value corresponding to the battery includes determining, based on the total power consumption value and the heat dissipation coefficient, the first power supply parameter value of the wireless charging device, and determining, based on the total power consumption value and the first power supply parameter value of the wireless charging device, the second power supply parameter value of the battery.

In some embodiments, the determining, based on the total power consumption value and the heat dissipation coefficient, the first power supply parameter value of the wireless charging device includes determining a product of the total power consumption value and the heat dissipation coefficient as the first power supply parameter value of the wireless charging device, and the determining, based on the total power consumption value and the first power supply parameter value of the wireless charging device, the second power supply parameter value of the battery includes determining a difference between the total power consumption value and the first power supply parameter value of the wireless charging device as the second power supply parameter value of the battery.

In some embodiments, the determining, based on the current temperature, the heat dissipation coefficient of the electronic device includes determining the heat dissipation coefficient corresponding to the current temperature based on a mapping relationship between temperatures and heat dissipation coefficients.

In some embodiments, the method further includes supplying power to the electronic device by using the wireless charging device in response to the current temperature being less than or equal to the preset temperature threshold.

According to a second embodiment of the present disclosure, a power supply apparatus is provided. The apparatus is applied to an electronic device and includes a first determination module, configured to determine a charging state related to charging a battery of the electronic device by using a wireless charging device a second determination module, configured to determine a current temperature of the electronic device, and a first power supply module, configured to supply power to the electronic device by using both the wireless charging device and the battery in response to the charging state indicating the battery being fully charged and the current temperature being greater than a preset temperature threshold.

In some embodiments, the first power supply module is specifically configured to determine, based on the current temperature, a first power supply parameter value corresponding to the wireless charging device and a second power supply parameter value corresponding to the battery, and supply power to the electronic device based on the first power supply parameter value and the second power supply parameter value.

In some embodiments, the apparatus further includes an obtaining module, configured to obtain a current total power consumption value of the electronic device. The first power supply module is specifically configured to determine, based on the current temperature, a heat dissipation coefficient of the electronic device, and determine, based on the total power consumption value and the heat dissipation coefficient, the first power supply parameter value corresponding to the wireless charging device and the second power supply parameter value corresponding to the battery.

In some embodiments, the first power supply module is specifically configured to determine, based on the total power consumption value and the heat dissipation coefficient, the first power supply parameter value of the wireless charging device, and determine, based on the total power consumption value and the first power supply parameter value of the wireless charging device, the second power supply parameter value of the battery.

In some embodiments, the first power supply module is specifically configured to determine a product of the total power consumption value and the heat dissipation coefficient as the first power supply parameter value of the wireless charging device, and determine a difference between the total power consumption value and the first power supply parameter value of the wireless charging device as the second power supply parameter value of the battery.

In some embodiments, the first power supply module is specifically configured to determine the heat dissipation coefficient corresponding to the current temperature based on a mapping relationship between temperatures and heat dissipation coefficients.

In some embodiments, the apparatus further includes a second power supply module, configured to supply power to the electronic device by using the wireless charging device in response to the current temperature being less than or equal to the preset temperature threshold.

According to a third embodiment of the present disclosure, an electronic device is provided. The electronic device includes a processor and a memory, configured to store an instruction executable by the processor. The processor is configured to implement the power supply method according to the first embodiment.

According to a fourth embodiment of the present disclosure, a storage medium is provided. An instruction in the storage medium, when executed by a processor of an electronic device, enables the electronic device to implement the power supply method according to the first embodiment.

The embodiments of the present disclosure provide technical solutions may include several beneficial effects. For example, in the embodiments of the present disclosure, power is supplied to the electronic device by using both the wireless charging device and the battery in response to determining that the battery is fully charged and the current temperature of the electronic device is greater than a preset temperature threshold. Since the voltage supplied through the battery is close to the power supply voltage of the system, there is no need for the process of voltage reduction and voltage stabilization, and thus the pathway impedance is smaller. Compared to a method of using only the wireless charging device to supply power, the embodiments of the present disclosure can reduce the heat generation of the electronic device. Compared to a method of using only the battery to supply power, the embodiments of the present disclosure can save battery power. It is understood that the method of using both the wireless charging device and the battery to supply power provided by the embodiments of the present disclosure can reduce the heat generation of the electronic device as much as possible while taking into account the battery power consumption, and thus can improve the user experience.

Those skilled in the art will easily come up with other embodiments of the present disclosure after considering the specification and practicing the present disclosure herein. The purpose of the present disclosure is to cover any variations, uses, or adaptive changes of the present disclosure, which follow the general principles of the present disclosure and include common knowledge or commonly used technical means in the technical field that are not disclosed in the present disclosure. The specification and embodiments are only considered to be examples, and the true scope and spirit of the present disclosure are indicated by the following claims.

It should be understood that the present disclosure is not limited to the precise structure already described above and shown in the accompanying drawings, and various modifications and changes may be made without departing from the scope of the present disclosure. The scope of the present disclosure is limited only by the accompanying claims.

The invention claimed is:

1. A power supply method, applied to an electronic device, comprising:
   determining a charging state related to charging a battery of the electronic device by using a wireless charging device;
   determining a current temperature of the electronic device; and
   supplying, in response to the charging state indicating the battery being fully charged and the current temperature being greater than a preset temperature threshold, power to the electronic device by using the wireless charging device and the battery;
   wherein the supplying power to the electronic device by using the wireless charging device and the battery comprises:
      determining, based on the current temperature, a first power supply parameter value corresponding to the wireless charging device and a second power supply parameter value corresponding to the battery; and
      supplying power to the electronic device based on the first power supply parameter value and the second power supply parameter value.

2. The method according to claim 1, further comprising:
   obtaining a current total power consumption value of the electronic device; wherein
   the determining the first power supply parameter value and the second power supply parameter value comprises:
      determining, based on the current temperature, a heat dissipation coefficient of the electronic device; and
      determining, based on the total power consumption value and the heat dissipation coefficient, the first power supply parameter value and the second power supply parameter value.

3. The method according to claim 2, wherein the determining, based on the total power consumption value and the heat dissipation coefficient, the first power supply parameter value and the second power supply parameter value comprises:
   determining, based on the total power consumption value and the heat dissipation coefficient, the first power supply parameter value; and determining, based on the total power consumption value and the first power supply parameter value, the second power supply parameter value.

4. The method according to claim 3, wherein the determining, based on the total power consumption value and the heat dissipation coefficient, the first power supply parameter value comprises:
determining a product of the total power consumption value and the heat dissipation coefficient as the first power supply parameter value; and
the determining, based on the total power consumption value and the first power supply parameter value, the second power supply parameter value comprises:
determining a difference between the total power consumption value and the first power supply parameter value as the second power supply parameter value.

5. The method according to claim 2, wherein the determining the heat dissipation coefficient comprises:
determining the heat dissipation coefficient corresponding to the current temperature based on a mapping relationship between temperatures and heat dissipation coefficients.

6. The method according to claim 1, further comprising:
supplying power to the electronic device by using the wireless charging device in response to the current temperature being less than or equal to the preset temperature threshold.

7. An electronic device, comprising:
a processor;
a memory, configured to store an instruction executable by the processor; wherein
the processor is configured to:
determine a charging state related to charging a battery of the electronic device by using a wireless charging device;
determine a current temperature of the electronic device; and
supply, in response to the charging state indicating the battery being fully charged and the current temperature being greater than a preset temperature threshold, power to the electronic device by using the wireless charging device and the battery;
wherein in supplying power to the electronic device by using the wireless charging device and the battery, the processor is configured to:
determine, based on the current temperature, a first power supply parameter value corresponding to the wireless charging device and a second power supply parameter value corresponding to the battery; and
supply power to the electronic device based on the first power supply parameter value and the second power supply parameter value.

8. The electronic device according to claim 7, wherein the processor is further configured to:
obtain a current total power consumption value of the electronic device; wherein
the processor is specifically configured to:
determine, based on the current temperature, a heat dissipation coefficient of the electronic device; and
determine, based on the total power consumption value and the heat dissipation coefficient, the first power supply parameter value and the second power supply parameter value.

9. The electronic device according to claim 8, wherein the processor is specifically configured to:

determine, based on the total power consumption value and the heat dissipation coefficient, the first power supply parameter value; and
determine, based on the total power consumption value and the first power supply parameter value, the second power supply parameter value.

10. The electronic device according to claim 9, wherein the processor is specifically configured to:
determine a product of the total power consumption value and the heat dissipation coefficient as the first power supply parameter value; and
determine a difference between the total power consumption value and the first power supply parameter value as the second power supply parameter value.

11. The electronic device according to claim 8, wherein the processor is specifically configured to:
determine the heat dissipation coefficient corresponding to the current temperature based on a mapping relationship between temperatures and heat dissipation coefficients.

12. The electronic device according to claim 7, wherein the processor is further configured to:
supply power to the electronic device by using the wireless charging device in response to the current temperature being less than or equal to the preset temperature threshold.

13. A non-transitory computer-readable storage medium, wherein an instruction in the storage medium, when executed by a processor of an electronic device, enables the electronic device to implement a power supply method, and the method comprises:
determining a charging state related to charging a battery of the electronic device by using a wireless charging device;
determining a current temperature of the electronic device; and
supplying, in response to the charging state indicating the battery being fully charged and the current temperature being greater than a preset temperature threshold, power to the electronic device by using the wireless charging device and the battery;
wherein the supplying power to the electronic device by using the wireless charging device and the battery comprises:
determining, based on the current temperature, a first power supply parameter value corresponding to the wireless charging device and a second power supply parameter value corresponding to the battery; and
supplying power to the electronic device based on the first power supply parameter value and the second power supply parameter value.

14. The storage medium according to claim 13, wherein the method further comprises:
obtaining a current total power consumption value of the electronic device; wherein
the determining the first power supply parameter value and the second power supply parameter value comprises:
determining, based on the current temperature, a heat dissipation coefficient of the electronic device; and
determining, based on the total power consumption value and the heat dissipation coefficient, the first power supply parameter value and the second power supply parameter value.

15. The storage medium according to claim 14, wherein the determining, based on the total power consumption value and the heat dissipation coefficient, the first power supply parameter value and the second power supply parameter value comprises:
- determining, based on the total power consumption value and the heat dissipation coefficient, the first power supply parameter value; and
- determining, based on the total power consumption value and the first power supply parameter value, the second power supply parameter value.

16. The storage medium according to claim 15, wherein the determining, based on the total power consumption value and the heat dissipation coefficient, the first power supply parameter value comprises:
- determining a product of the total power consumption value and the heat dissipation coefficient as the first power supply parameter value; and
- the determining, based on the total power consumption value and the first power supply parameter value, the second power supply parameter value comprises:
- determining a difference between the total power consumption value and the first power supply parameter value as the second power supply parameter value.

17. The storage medium according to claim 14, wherein the determining the heat dissipation coefficient comprises:
- determining the heat dissipation coefficient corresponding to the current temperature based on a mapping relationship between temperatures and heat dissipation coefficients.

* * * * *